United States Patent [19]
Genbauffe

[11] 3,780,940
[45] Dec. 25, 1973

[54] CONTROL SYSTEM AND CONTROL DEVICE THEREFOR OR THE LIKE

[75] Inventor: Francis S. Genbauffe, Irwin, Pa.

[73] Assignee: Robertshaw Controls Company, Richmond, Va.

[22] Filed: June 1, 1972

[21] Appl. No.: 258,798

[52] U.S. Cl................. 236/15 A, 192/93 A, 251/89
[51] Int. Cl............................................. F23n 1/00
[58] Field of Search.................... 251/89; 236/15 A; 192/93 A, 95

[56] References Cited
UNITED STATES PATENTS
3,011,721   12/1961   Wiltz................................. 236/15 A Primary Examiner—William E. Wayner
Attorney—Auzville Jackson, Jr. et al.

[57] ABSTRACT

A control device for interconnecting a source of fuel to a burner, the control device having a valve seat and a movable valve member for controlling the valve seat. A movable selector is carried by the control device and a clutch is adapted to interconnect the selector to the valve member, the clutch having means for moving the valve member from an "off" position to a full "on" position thereof, as the selector is moved in one direction from its "off" position to a first position thereof. The clutch keeps the valve member in the full "on" position thereof as the selector is moved in the one direction from the first position thereof to a second position thereof. The clutch thereafter moves the valve member from its full "on" position to a reduced "on" position thereof as the selector is moved in the one direction from the second position thereof to a third position thereof, the clutch being adapted to move the valve member from the reduced "on" position thereof back to the full "on" position thereof as the selector is moved in a direction opposite to the one direction from the third position thereof to the second position thereof.

10 Claims, 16 Drawing Figures

PATENTED DEC 25 1973 3,780,940

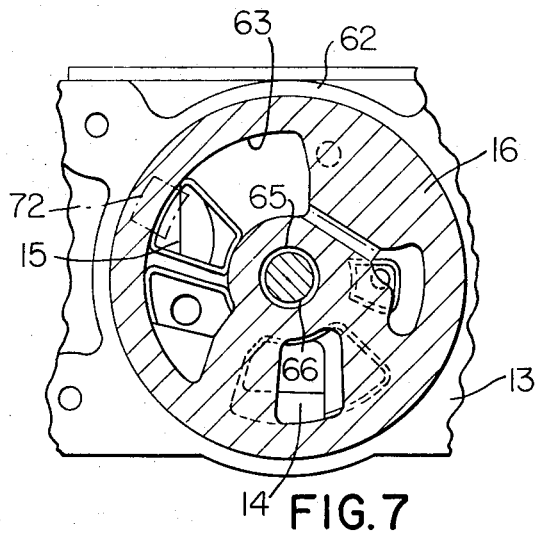
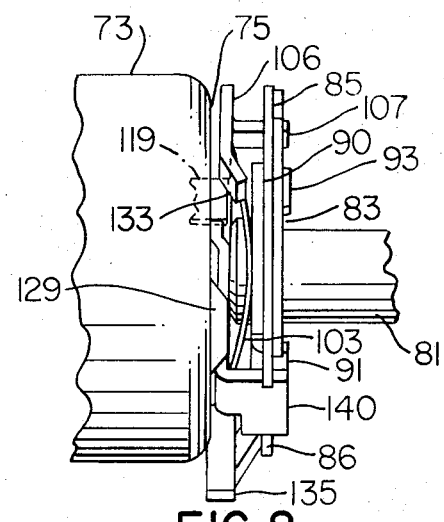
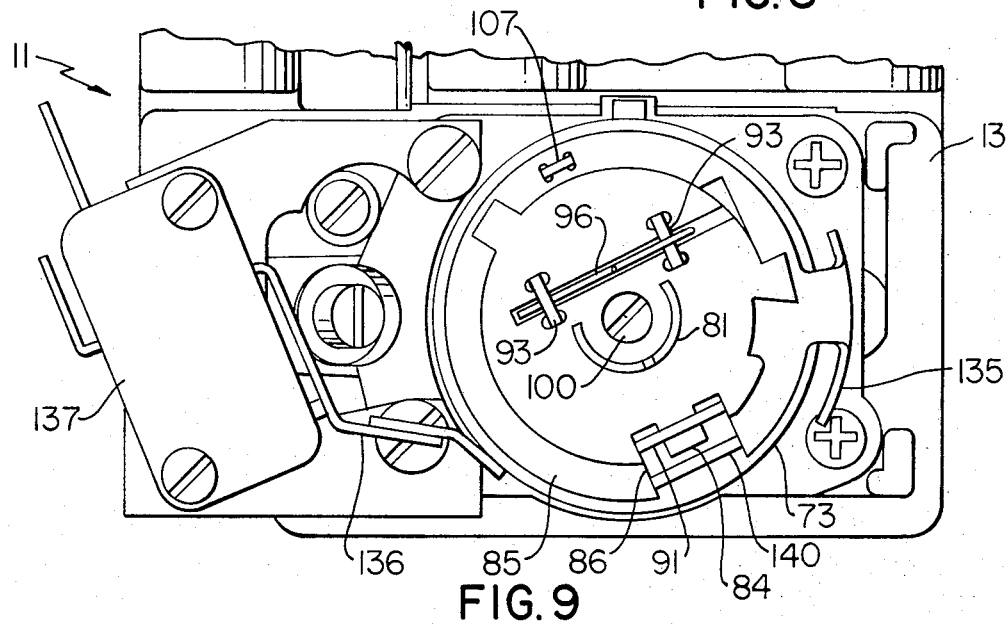
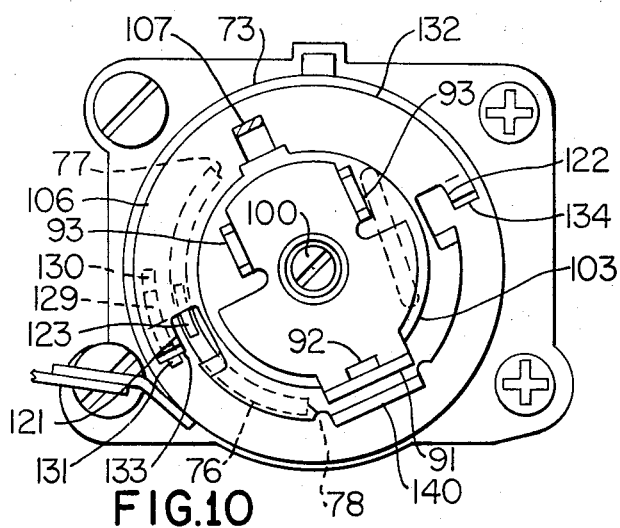
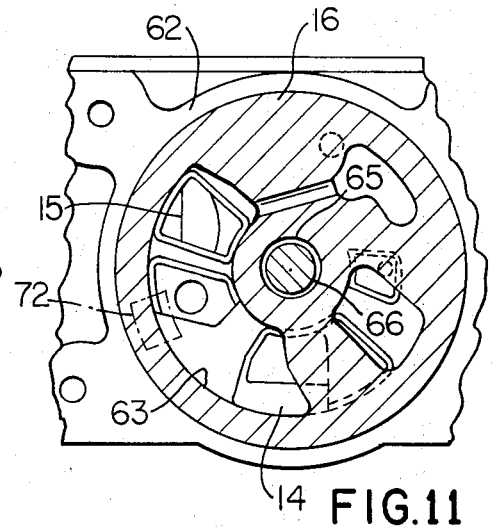

CONTROL SYSTEM AND CONTROL DEVICE THEREFOR OR THE LIKE

This invention relates to an improved fuel control system as well as to an improved control device for such a fuel control system or the like.

It is well known that control devices have been provided for controlling the flow of fuel to a main burner means, such as the burner means of a cooking apparatus or the like, the control device having a selector movable through various ranges of movement thereof for controlling the output temperature effect of the burner means in a certain manner.

For example, when the selector of the control device is first moved from an "off" position thereof toward an "on" position thereof, clutch means of the control device interconnect the selector to a main valve member of the control device and moves the same from an "off" position thereof to a full "on" position thereof so that full fuel flow can be provided to the main burner means when the output temperature effect of the main burner means is below the output temperature setting of the selector means of the selector. The selector is then adapted to be moved in the same direction and be declutched from the main valve member while operating a thermostatically controlled means of the control device for setting the desired temperature output effect of the burner means, such as through a normal cooking temperature range until the selector means reaches a broil position. At this time, the broiling operation of the main burner means is provided with a full fuel flow so that a high flame is being produced at the main burner means. However, it is sometimes desired to reduce the flame size of the main burner means during a broiling operation so that the prior known clutch means would re-engage with the main valve member to cause the same to reduce the fuel flow to the main burner means as the selector is further moved from the broil position thereof in the same direction toward a low flame broil position of the selector.

However, such prior known clutch means required the user of the control device to return the selector completely to the full "off" position thereof in order to move the main valve member of the control device back to its "off" position before the operator could move the selector into the baking range position thereof for full fuel flow for a baking operation.

According to the teachings of this invention, however, a clutch means is provided for such a control device and permits the selector when set in a low flame broil position thereof to move the main valve member back to the full "on" position thereof as the selector is initially moved from the low broil setting thereof back to the high flame broil setting thereof so that the operator need not move the selector all the way back to the full "off" position should a baking operation be desired following a broiling operation.

In particular, one embodiment of this invention provides an improved control device for interconnecting a source of fuel to a burner means, the control device having a valve seat means and a movable valve member means for controlling the valve seat means. A movable selector means is carried by the control device. Clutch means is carried by the control device for interconnecting the selector means to the valve member means, the clutch means having means for moving the valve member means from an "off" position thereof to a full "on" position thereof as the selector means is moved in one direction from its "off" position to a first position thereof. The means of the clutch means keeps the valve member means in the full "on" position thereof as the selector means is moved in the one direction from the first position thereof to a second position thereof. The means of the clutch means moves the valve member means from the full "on" position thereof to a reduced "on" position thereof as the selector means is moved in the one direction from the second position thereof to a third position thereof. The means of the clutch means moves the valve member means from the reduced "on" position thereof to the full "on" position thereof as the selector means is moved in a direction opposite to the one direction from the third position thereof back to the second position thereof. The means of the clutch means keeps the valve member means in the full "on" position thereof as the selector means is moved in the opposite direction from the second position thereof back to the first position thereof. Thereafter, the means of the clutch means moves the valve member means from the full "on" position thereof back to the "off" position thereof as the selector means is moved in the opposite direction from the one direction back to the "off" position thereof.

Accordingly, it is an object of this invention to provide an improved control device having one or more of the novel features set forth above or hereinafter shown or described.

Another object of this invention is to provide an improved control system utilizing such a control device or the like.

Other objects, uses and advantages of this invention are apparent from the reading of this description which proceeds with reference to the accompanying drawings forming a part thereof and wherein:

FIG. 7 is a fragmentary, cross-sectional view taken on line 7—7 of FIG. 5.

FIG. 8 is a fragmentary side view of the control device illustrated in FIG. 4.

FIG. 9 is a view similar to FIG. 2 and illustrates the control device set in another operating position thereof.

FIG. 10 is a view similar to FIG. 4 and illustrates the control device set in the position of FIG. 9.

FIG. 11 is a view similar to FIG. 7 and illustrates the control device set in the position of FIG. 9.

Figure 1:
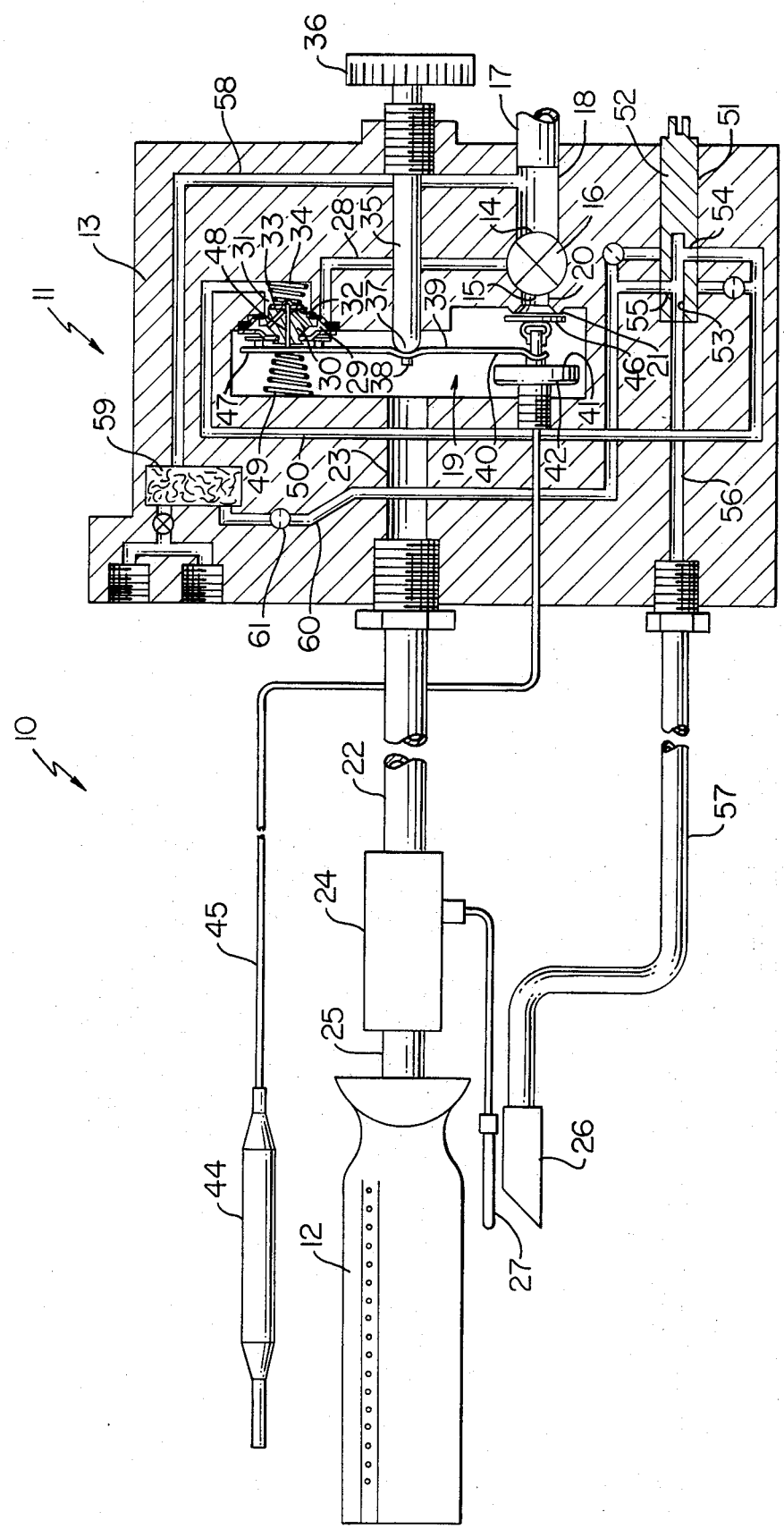
FIG. 1 is a schematic view illustrating the improved fuel control system of this invention.
Figure 2:
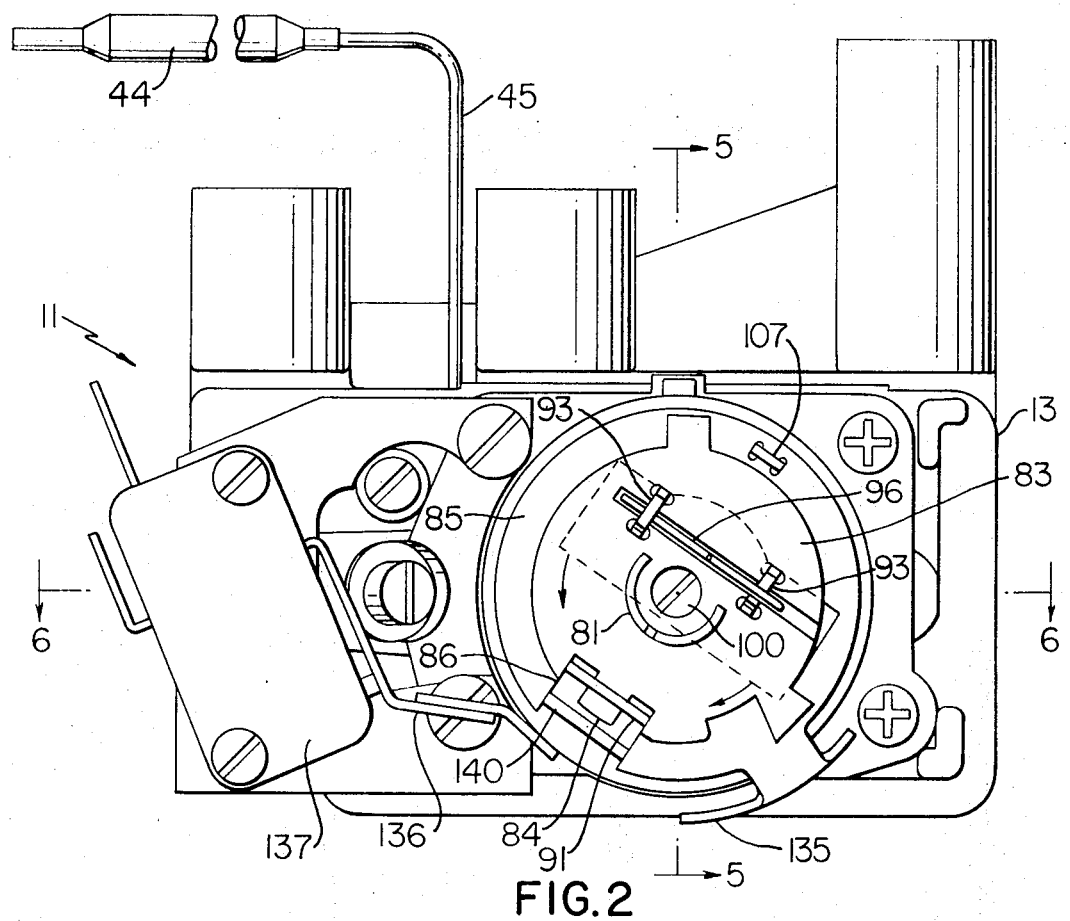
FIG. 2 is a front view of the control device of this invention with the control knob thereof removed.

While the various features of this invention are hereinafter described and illustrated as being particularly adapted for controlling a single burner means for a cooking apparatus, it is to be understood that the various features of this invention can be utilized singularly or in any combination thereof to provide control means for other devices as desired.

Therefore, this invention is not to be limited to only the embodiment illustrated in the drawings, because the drawings are merely utilized to illustrate one of the wide variety of uses of this invention.

Referring now to FIG. 1, the improved control system of this invention is generally indicated by the reference numeral 10 and includes a control device 11 of this invention for controlling the operation of a main burner means 12 disposed in a domestic oven or the like, the control device 11 including a housing 13.

The housing means 13 has an inlet 14 and an outlet 15 adapted to be interconnected together by a main disc valve member 16 in a manner hereinafter described, the inlet 14 being adapted to be interconnected to a fuel supply conduit 17 by a passage means 18 and the outlet 15 being adapted to be interconnected to a chamber 19 formed in the housing means 13 by a passage means 20 that terminates at a valve seat 21. The chamber 19 is adapted to be interconnected to a conduit 22 leading to the inlet side of a safety valve 24. The outlet side of the safety valve 24 is interconnected to the main burner 12 by a conduit 25.

A pilot burner 26 is disposed in the oven and is adapted to normally have a continuously burning small standby flame in a manner hereinafter described. However, when additional fuel is supplied to the pilot burner 26 in a manner hereinafter described, the same provides a relatively large heater flame which is sensed by a bulb 27 to open the safety valve 24 and interconnect the conduits 22 and 25 together whereby as long as a large heater flame appears at the pilot burner 26, the chamber 19 of the control device 11 is interconnected to the main burner 12. However, when the heater flames cease to exist at the pilot burner 26, the safety valve 24 closes and prevents fluid communication between the chamber 19 of the control device 11 and the main burner means 12 for a purpose hereinafter described.

When the disc valve 16 is moved to an "on" position thereof in a manner hereinafter described, the same not only interconnects the inlet 14 with the outlet 15, but also interconnects the inlet 14 with a passage means 28 leading to a chamber 29 defined by a valve seat member 30 carried by the housing 13. The chamber 29 is separated from a chamber 31 by a valve seat 32 being opened and closed by a valve member 33 urged to the closed position by a compression spring 34.

An axially movable fulcrum pin 35 is carried by the housing 13 in such a manner that the axial position of the fulcrum pin 35 relative to the housing 13 is controlled by a control knob 36 in a manner hereinafter described. The fulcrum pin 35 has a rounded end 37 provided with a cylindrical projection 38 passing through a suitable aperture in a lever 39 whereby the lever 39 is fulcrumed on the end 37 of the fulcrum pin 35.

One end 40 of the lever 39 bears against a movable wall 41 of an expandable and contractable power element 42 being interconnected to an oven temperature sensing bulb 44 by a conduit 45. The movable wall 41 of the expandable and contractable element 42 carries a valve member 46 for closing the valve seat 21 if a runaway temperature condition should exist in the oven.

The other end 47 of the lever 39 is adapted to engage a plunger 48 carried by the valve seat member 30 and engaging the valve member 33, the end 47 of the lever 39 being urged on a clockwise direction in FIG. 1 by a compression spring 49. Thus, the opening and closing of the valve member 33 is controlled by the lever 39 in relation to the temperature sensed by the bulb 44 and the axial position of the fulcrum pin 35 in a manner hereinafter described.

The chamber 31 of the housing 13 is interconnected to a passage means 50 leading to a bore 51 in the housing 13. An adjusting key 52 is rotatably disposed in the bore 51 and has a longitudinal bore 53 interconnected to the exterior of the key 52 by branch passages 54 and 55. The longitudinal bore 53 of the adjusting key 52 is disposed in communication with a passage 56 leading to a conduit 57 interconnected to the pilot burner 26.

Another passage 58 is formed in the housing 13 and is interconnected with the passage 18 at a point upstream from the disc valve 16 as well as to a filter chamber 59. The filter chamber 59 is interconnected to a passage 60 leading to the bore 51 in a manner illustrated in FIG. 1, the passage 60 having an orifice 61 therein.

Thus, it can be seen that when the adjusting key 52 is disposed in the position illustrated in FIG. 1, fuel from the supply conduit 17 is adapted to pass through the passages 58 and 60 to the passage 55 of the adjusting key 52 and, thus, to the pilot burner 26 to provide the previously mentioned small standby flame which does not affect the opening or closing of the safety valve 24. Thus, the small standby flame is a continuously burning flame.

However, when the disc valve 16 is moved to an open position and the valve member 33 is moved to an open position in a manner hereinafter described, the additional fuel being supplied to the passage 54 of the adjusting key 52 causes the pilot burner 26 to provide the large heater flame which is sensed by the bulb 27 and causes the safety valve 24 to open and interconnect the conduits 22 and 25 together so that fuel can issue from the main burner 12 and be ignited by the pilot burner 26. However, when the valve member 33 closes, the additional supply of fuel to the pilot burner 26 is terminated whereby the large heater flame ceases to exist, even through the small standby flame continues, whereby the safety valve 24 will close and prevent fuel from issuing from the main burner 12.

Thus, as the valve member 33 cycles between its opened and closed positions in a manner hereinafter described, the main burner 12 is cycled on and off to maintain the temperature of the oven at a temperature selected by the control valve or selector means 36 in a manner hereinafter described.

Figure 5:
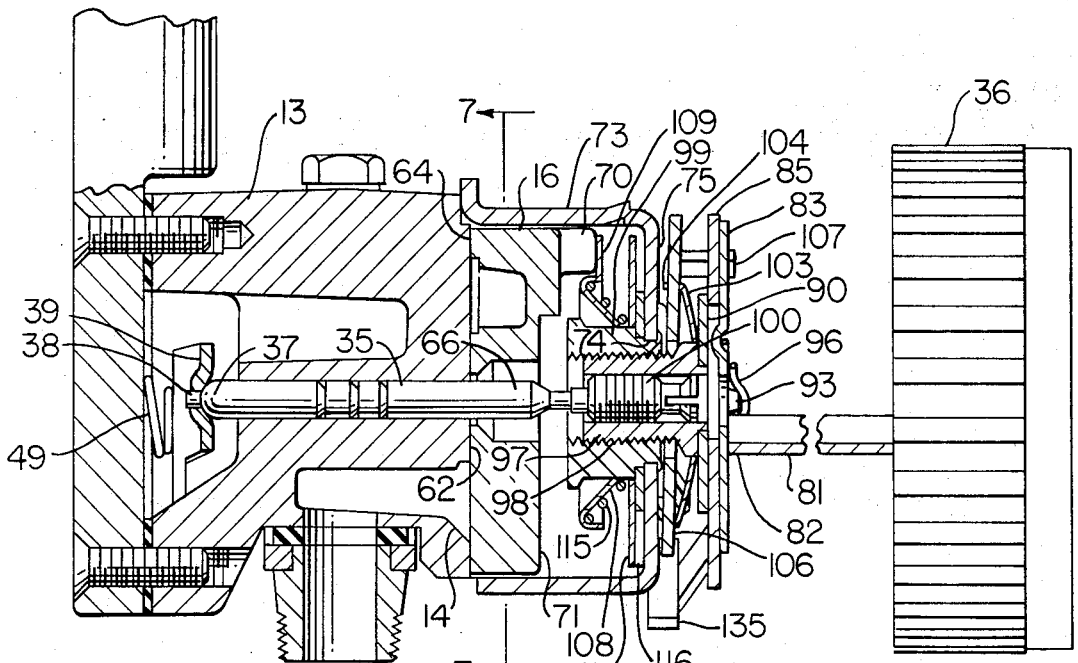
FIG. 5 is a fragmentary, cross-sectional view taken on line 5—5 of FIG. 2.
Figure 6:
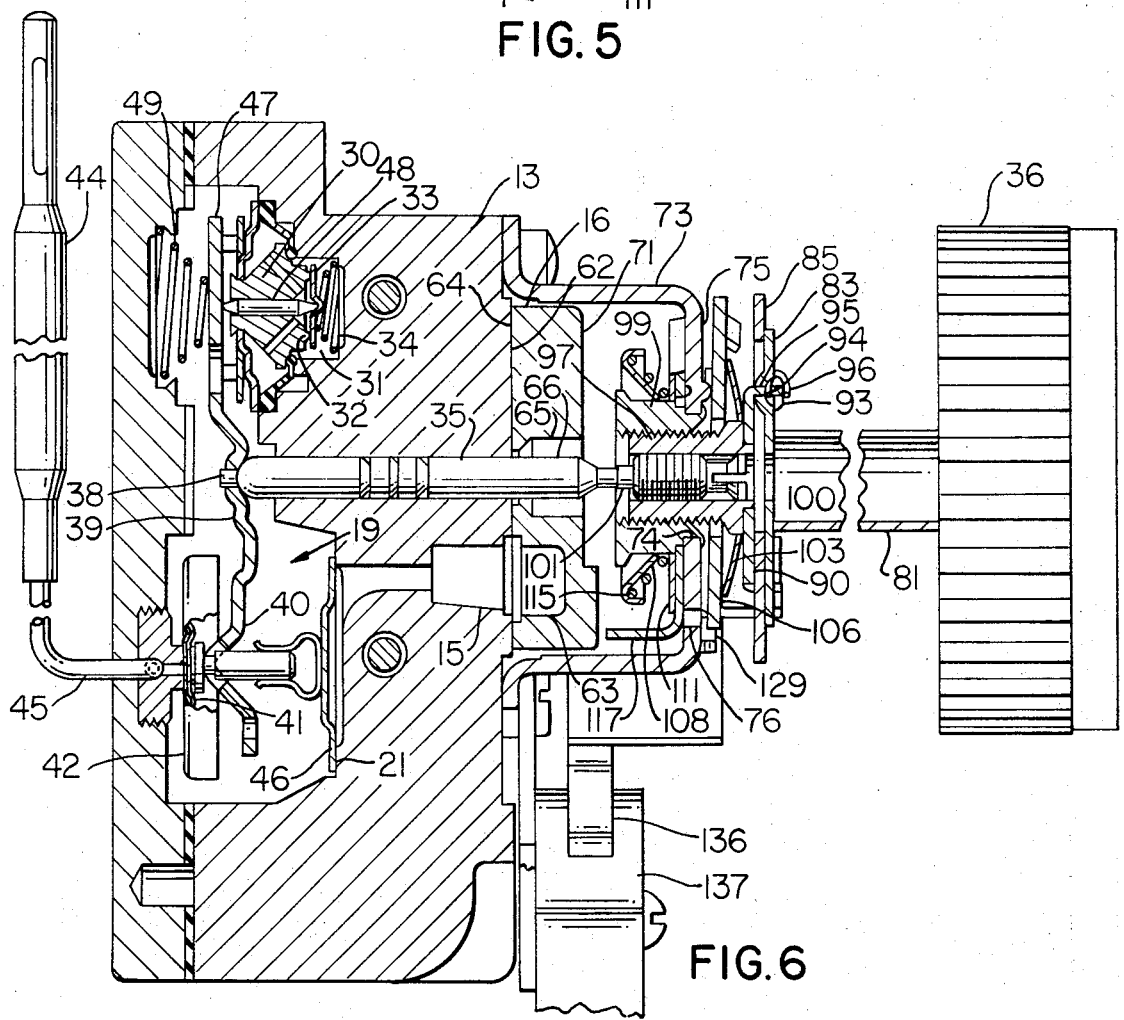
FIG. 6 is a fragmentary, cross-sectional view taken on line 6—6 of FIG. 2.
Figure 12:
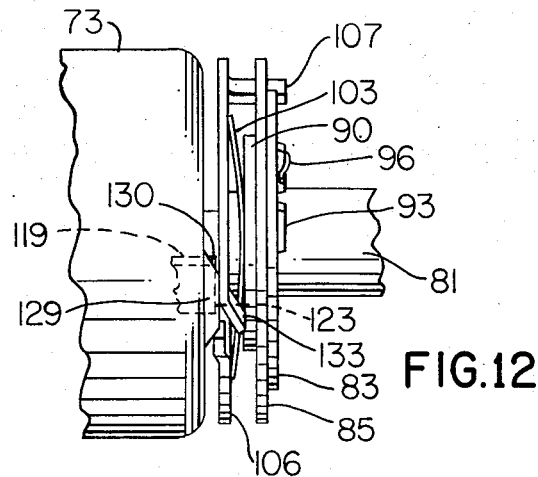
FIG. 12 is a view similar to FIG. 8 and illustrates the control device when set in the position of FIG. 9

As illustrated in FIGS. 5 and 6, the housing means 13 defines a flat surface 62 interrupted by the spaced inlet 14 and outlet 15 which are adapted to be interconnected together by a groove 63 in the disc valve 16 as illustrated in FIG. 11 when the disc valve 16 is turned to an "on" position thereof. In particular, the groove 63 in the disc valve 16 interrupts a valve surface 64 thereof with the valve surface 64 being disposed in sealing and sliding contact with the valve surface 62 of the housing 14, the disc valve 16 having an opening 65 passing therethrough and loosely receive the end 66 of the fulcrum pin 35.

Figure 16:
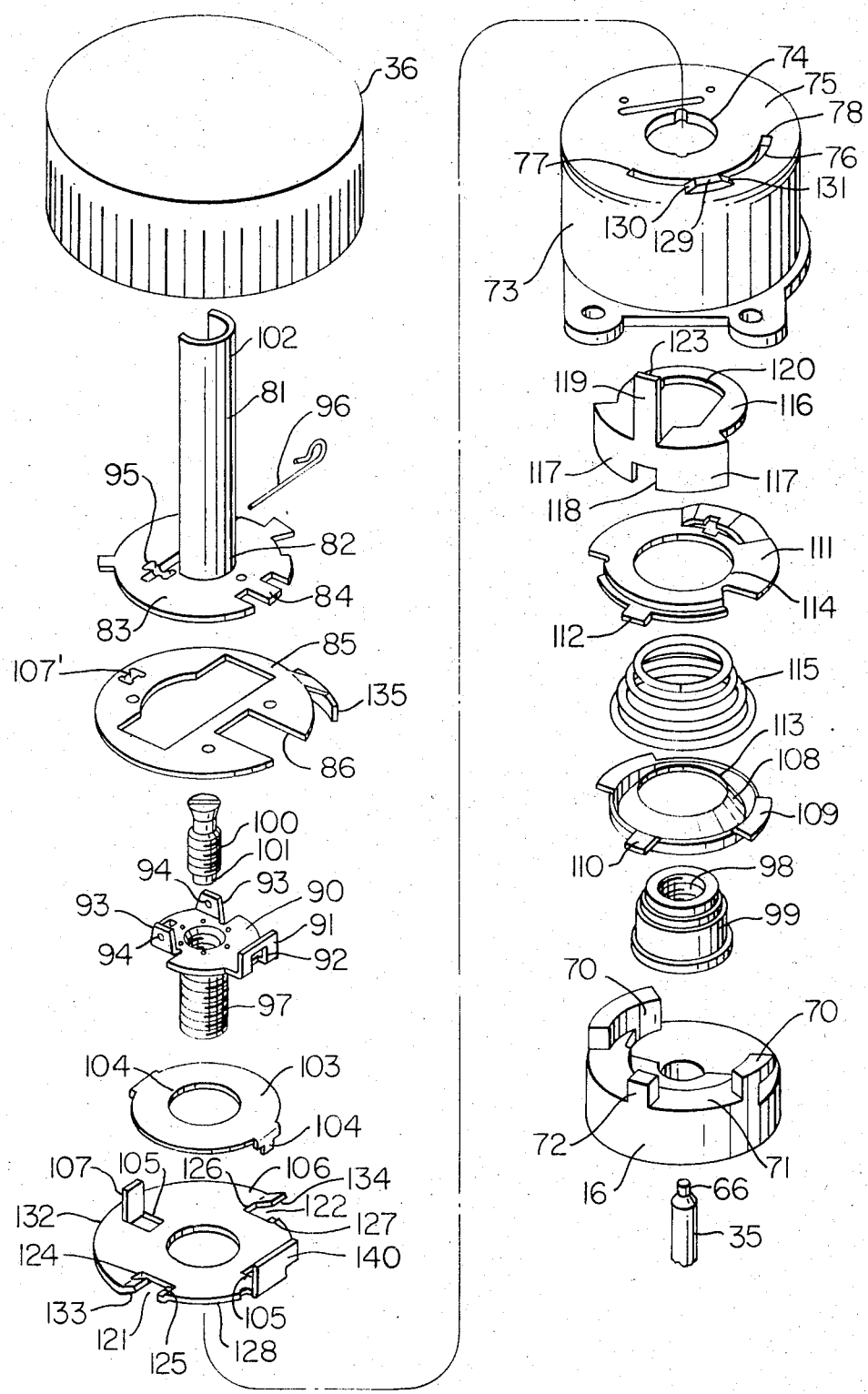
FIG. 16 is an exploded perspective view of the various parts of the control device for effecting the movement of the selector means and the main valve member of the control device.

As illustrated in FIGS. 5, 6 and 16, the disc valve 16 has a pair of spaced arcuate abutments or embossments 70 formed on the side 71 thereof and a smaller rectangular embossment 72 disposed intermediate the embossment 70 for a purpose hereinafter described.

A cup-shaped casing member 73 forms part of the housing means 13 and is telescopically disposed over the disc valve 16, the member 73 having an aperture 74 passing therethrough in the closed end 75 thereof. The closed end 75 has a cam slot 76 formed therein and defining opposed ends 77 and 78 as thus illustrated in FIG. 16.

A C-shaped shaft 81 has one end 82 thereof interconnected to a plate member 83 having an outwardly directed tang 84. A plate member 90 has a bent over tang 91 provided with a slot 92 and a pair of ears 93 having apertures 94 passing therethrough. The members 83 and 90 are adapted to be assembled together with the tang 84 of the member 83 being received in the slot 92 of the member 90 and with the ears 93 of the member 90 passing through slots 95 of the plate member 83 and being pinned thereto by a pin means 96 passing through the apertures 94. Another plate member 85 is sandwiched between the interconnected plates 83 and 90 and received the tang 91 of the plate 90 in a cutout 86 thereof whereby rotation of the shaft 81 causes like rotation of the plate members 83, 85 and 90.

The plate member 90 carries a tubular extension 97 internally and externally threaded, the tubular extension 97 being adapted to be threadedly received in a threaded bore 98 of a member 99, adapted to be fixed in the aperture 74 of the cup-shaped housing 73.

An adjusting screw 100 is threaded in the tubular part 97 of the plate 90 and has a pin 101 adapted to abut the end 66 of the fulcrum pin 35.

Thus, rotation of the control knob 36 fastened on the other end 102 of the C-shaped shaft 81 cause the member 97 to be inserted into or out of the fixed threaded member 99 to adjust the axial position of the fulcrum pin 35 relative to the housing 13.

A bowed spring-like washer 103 is provided and has tangs 104 adapted to register with apertures 105 of a cam plate 106 disposed intermediate the closed end 75 of the cup-shaped housing member 73 and the bowed washer 103 which, in turn, is disposed intermediate the cam plate 106 and the plate 90.

The cam plate 106 has upwardly directed tangs 107 and 140 passing respectively through a slot 107' and the recess 86 of the plate 85 so that the cam plate 106 is rotated in unison with the C-shaped shaft 81 for a purpose hereinafter described.

A spring retainer 108 is provided and has outwardly directed tangs 109 adapted to rest on the embossment 70 of the disc valve 16. The retainer 108 also has another tang 110. Another spring retainer 111 is provided and has an outwardly directed tang 112 similar to tank 110 of the spring retainer 108, retainers 108 and 111 respectively having openings 113 and 114 passing therethrough so that the same can be telescoped on the fixed threaded member 99. A compression spring 115 is adapted to be disposed between the spring retainers 108 and 111 to compact a clutch member 116 against the inside surface of the wall 75 of the cup-shaped housing part 73.

The clutch part 116 has a pair of depending flanges 117 defining a notch 118 therebetween adapted to not only receive the tangs 112 and 110 of the spring retainers 111 and 108, but also to receive the rectangular embossment 72 of the disc valve 16. In addition, the clutch member 116 has an outwardly directed tang 119 adapted to pass through the cam slot 76 of the housing part 73, the clutch part or drive member 116 having an aperture 120 passing therethrough to loosely receive the fixed member 99.

The cam plate 106 has a pair of notches 121 and 122 formed therein with the notches 121 and 122 of the cam plate 106 being in rotational alignment with the end 123 of the tang 119 of the clutch member 116 so as to receive the same therein between opposed ends 124 and 125 and 126, 127 thereof when aligned therewith.

The cam member 106 has a first arcuate outer portion 128 that is adapted to rotate on the inside of an outwardly directed stationary cam abutment 129 projecting out of the end 75 of the cup-shaped housing member 73 adjacent the slot thereof, the stationary cam 129 having angled leading and trailing ends 130 and 131 for a purpose hereinafter described.

Another arcuate peripheral portion 132 of the cam member 106 is in rotational alignment with the stationery cam 129 of the housing member 73 and is provided with angled ends 133 and 134 respectively adjacent the slots 121 and 122 therein for a purpose hereinafter described.

The bowed washer 103 between the plate member 90 and the cam plate 106 tends to force the plate member 106 toward the closed end 75 of the housing member 73, and, thus toward the cam 129 thereof as well as toward the tang 119 of the drive member 116.

The plate member 85 is provided with outwardly directed arcuate tang 135 adapted to operate against a plunger arm 136 of an electrical switch 137 carried by the housing means 13 of the control device 11 when the control knob 36 is moved to a broiling position thereof whereby the switch 137 can control any desired structure when the control device 11 is set for a broiling operation whether the broiling operation is with a high flame or low flame at the burner means 12 as will be apparent hereinafter.

The operation of control device 11 as utilized in the system 10 of this invention with the parts heretofore described will now be described.

Assuming that the control knob or selector means 36 is dispsed in the "off" position as illustrated in FIGS. 2-8, the groove 63 of the disc valve 16 is in such a position that the same does not interconnect the inlet 14 with the outlet 15, nor the inlet 14 with the passage means 28 whereby no fuel can issue from the main burner means 12 and only a small standby flame exists at the pilot burner 26 since the adjusting key 42 is normally disposed in the "on" position as illustrated in FIG. 1. Further, with the control knob 36 set in the "off" position, the tang 119 of the clutch member or drive member 116 is disposed in the notch 121 of the cam plate 106 with the angled cam surface 133 thereof being out of rotational engagement with the stationary cam 129 of the casing member 73 in the manner illustrated in FIG. 4.

Figure 3:
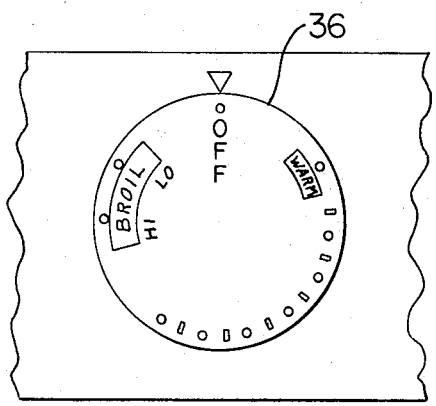
FIG. 3 is a front view of the control device mounted to a cooking apparatus and having the control knob thereon.
Figure 4:
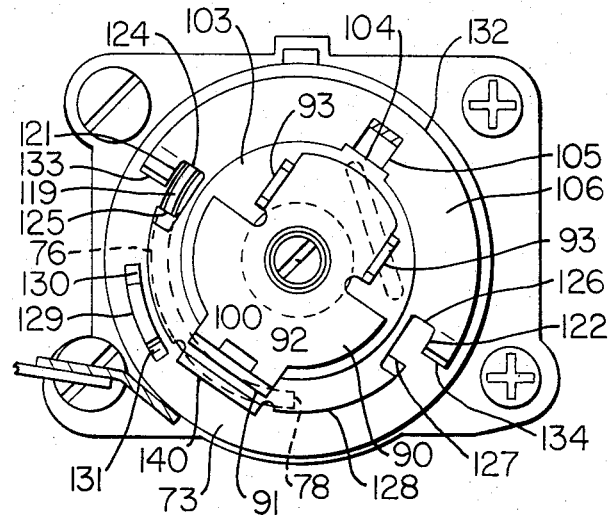
FIG. 4 is a fragmentary front view similar to FIG. 2 with certain parts of the control device removed.

When the operator desires to turn on the oven to a set temperature thereof, such as a baking temperature of 350° F, the operator grasps the knob 36 and rotates same in a counterclockwise direction in FIG. 3 whereby rotation of the knob 36 causes like rotation of the plates 83, 85, 90, 103 and 106 in a counterclockwise direction in FIG. 4 so that the tang 119 is driven therewith in a counterclockwise direction. Thus, the drive member 116 rotates in unison with the knob 36 and through the notch 118 thereof rotates the spring retainers 111 and 108 as well as the disc valve 16 to bring the groove 63 of the disc valve 16 in such a position that the same fully interconnects the inlet 14 with the outlet 15 as well as the inlet 14 to the passage means 28 in the manner illustrated in FIGS. 9, 10 and 11. When the groove 63 fully interconnects the inlet 14 with outlet 15, the control knob 36 has been rotated in a counterclockwise direction in FIG. 3 from the "off" position thereof to the low keep warm temperature of about 170°. However, at this time, the angled end 133 of the peripheral portion 132 of the cam member 106 begins to ride up the leading cam surface 130 of the stationary cam 129 of the casing 73 so that any further rotation in a counterclockwise direction of the cam plate 106 causes the cam plate 106 to be cammed upwardly by the stationary cam 129 and cause the notch 121 to clear the end 123 of the tang 119 of the drive member 116 and thus, disengage the selector means 36 of the control device 11 from the disc valve 16.

Thus, further counterclockwise rotation of the control knob 36 in FIG. 3 from the position illustrated in FIG. 9 toward the first part of the broil position on the control knob 36, the cam member 129 on the casing 73 bears against the under surface of the peripheral portion 132 of the cam plate 106 to hold the cam plate 106 above the end 123 of the tang 119 of the drive member 116 so that the disc valve 16 remains with its recess 63 fully interconnecting the inlet 14 with the outlet 15 in the manner illustrated in FIG. 3 even though the control knob 36 is being further rotated to a desired set temperature position, such as the selected baking temperature of 350° F.

During the rotation of the control knob or selector 36 from its keep warm position of FIG. 10 to a set temperature position thereof, the threaded member 97 of the plate 90 is backed out of the fixed member 99 in such a manner that the fulcrum pin 35 is adjusted to a new axial position thereof to the right in FIGS. 5 and 6 as selected by the temperature setting of the control knob 36. This axial movement of the pin 35 from its "off" position to the selected temperature position permits the compression spring 49 to pivot the lever 39 on the fulcrum pin 35 in such a manner that the pin 48 carried by the valve seat member 30 is moved to the right in FIGS. 5 and 6 to open the valve member 33 away from the valve seat 32 so that fuel in the passage 28 is now adapted to pass to the chamber 31 and, thus, to the pilot burner 26 to create the large heater flame at the pilot burner 26. When the larger heater flame exists at the pilot burner 26, the temperature sensing bulb 27 senses the presence of the same and opens the safety valve 24 whereby fuel from the chamber 19 is adapted to flow to the main burner 12 and be ignited by the pilot burner 26.

Thus, as long as the temperature of the oven remains below the selected temperature, the main burner means 12 is operating. However, when the temperature of the oven reaches the selected temperature, as sensed by the sensing bulb 44, the movable wall 41 of the expansible and contractible element 42 has moved to the right in FIG. 6 to such an extent that the same pivots the lever 39 on the fulcrum pin 35 to a position which permits the valve member 33 to close against the valve seat 32 and terminate the additional flow of fuel to the pilot burner 26. Thus, the large heater flame at the pilot burner 26 ceases to exist whereby the safety valve 24 closes to terminate the flow of fuel to the main burner means 12.

Should the temperature of the oven again fall below the selected temperature, the movable wall 41 of the power element 42 has moved to the left in FIG. 6 a distance sufficient to cause the lever 39 to again open the valve member 33 so that the heater flame again exists at the pivot burner 26. The heater flame at the pilot burner 26 causes the safety valve 24 to again open so that the fuel can again issue from the main burner means 12 and be ignited by the pilot burner 26.

Thus, it can be seen that the control device 11 of this invention permits the control knob 36 to be turned from an "off" position thereof to rotate the disc valve 16 to a fully "on" position thereof and also to adjust the axial position of the fulcrum pin 35 so that the control device 11 will maintain the oven at the selected temperature, the control device 11 of this invention being so constructed and arranged that the drive member 116 declutches the disc valve 16 from the control knob 36 during the rotational movement of the control knob 36 after the disc valve has been disposed in its full "on" position until the control knob 36 is moved into the first part of the broil range of the control knob 36. At this time, the notch 122 of the cam member 106 has been rotated into registration with the end 123 of the tang 119 of the drive member 116 and the angled portion 134 of the cam plate 106 now rides down the trailing edge 131 of the cam member 129 so that the clutch member 106 is now in driving engagement with the tang 119 of the drive member 116. However, at the initial part of the broil position of the control knob 36 wherein the cam member 106 is again clutched to the drive member 116, the disc valve 16 is only slightly rotated from the position illustrated in FIG. 11 so that the full fuel flow still is provided from the inlet 14 to the outlet 15 by the groove 63 of the disc valve 16. Also, such rotation of the control knob 36 into the broil range causes the fulcrum pin 35 to have been so adjusted that the same will provide a continuous on operation of the burner 12 for a broiling operation as is well known in the art with the flames at the burner 12 being of the maximum height because the disc valve 16 is providing full fuel flow to the outlet 15.

Figure 13:
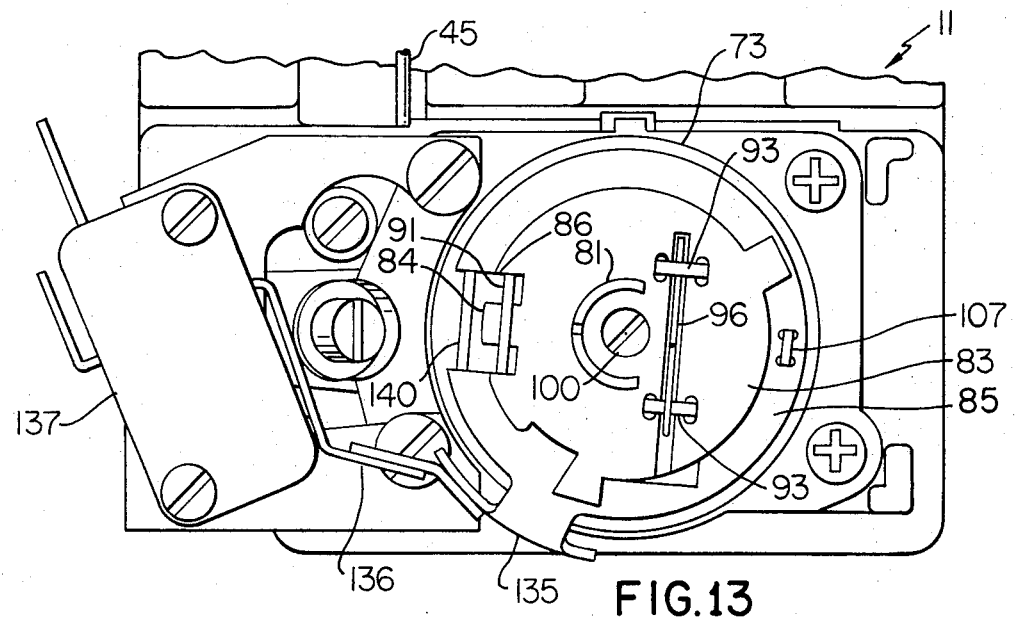
FIG. 13 is a view similar to FIG. 2 and illustrates the control device when set in a low flame broiling position thereof.
Figure 14:
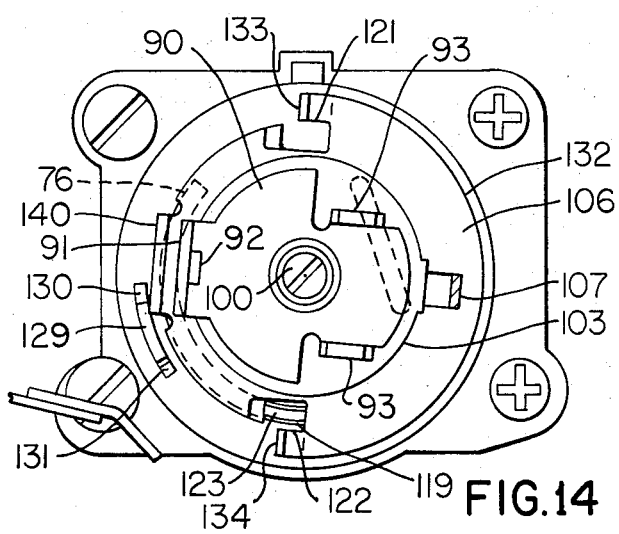
FIG. 14 is a view similar to FIG. 4 and illustrates the control device set in the position of FIG. 13.
Figure 15:
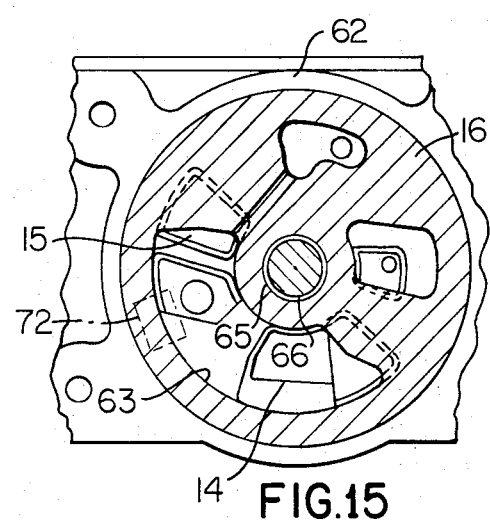
FIG. 15 is a view similar to FIG. 7 with the control device set in the position of FIG. 13.

However, should the housewife or the like desire to reduce the size of the flames at the continuously operating burner 12 during the broiling operation, the housewife can continues to rotate the selector or control knob 36 in a counterclockwise direction in FIG. 3 to position lower flame portions of the broil setting thereof adjacent the indicator on the control panel of FIG. 3 and such movement of the control knob 36 through the broil range thereof causes the disc valve 16 to rotate in unison therewith and have the groove 63 in the disc valve 16 reduce its registration with the outlet 15 to thereby reduce the flow of fuel to the outlet 15 and, thus, to the burner 12 through the chamber 19 of the housing means 13. When the control knob 36 has been rotated to its fullest position in a counterclockwise direction to position the lowest flame setting for the broiling operation in the manner illustrated in FIGS. 13–15, it can be seen that a reduced fuel flow is now provided by the groove 63 from the inlet 14 to the outlet 15 to produce the lowest sized flames at the burner 12 during the broiling operation.

Upon the return of the selector or control knob 36 from the low flame broil setting position thereof and toward the off position thereof, such clockwise rotation of the knob 36 causes the disc valve 16 to rotate in unison therewith until full fuel flow is provided by the groove 63 in the disc valve 16 between the inlet 14 and outlet 15 as illustrated in FIG. 11 at which time the surface 134 of the cam plate 106 again cams against the surface 131 of the stationary cam 129 to raise the cam plate 106 and disengage the tang 119 of the drive member 116 from the notch 122 of the cam plate 106. Of course, this happens when the control knob 36 is being rotated back to the highest temperature setting position thereof for a normal cooking operation or baking operation of the burner means 12 so that the member 106 remains disengaged from the drive member 116 until the control knob 36 is again rotated back to the keep warm position of FIG. 10 to cause the notch 121 to again align with the tang 119 and have the portion 133 of the cam plate 106 ride down the leading edge 130 of the cam member 129 and thereby again interconnect the cam member 106 to the tang 119 of the drive member 116. Thus, further clockwise rotation of the control knob 36 in FIG. 3 towards its "off" position will cause the disc valve 16 to rotate in unison therewith back to the "off" position as illustrated in FIG. 7.

Thus, it can be seen that when the housewife has utilized the control device 11 to provide a broiling operation and has used a reduced flame size at the burner means 12 during such broiling operation, the housewife need not return the control knob 36 back to its "off" position to readjust the flame size provided by the disc valve 16 as she can directly move from the broil position of the control knob 36 into the desired baking temperature range position of the control knob 36 and the clutch means that interconnects the control knob 36 to the disc valve 16 will return the disc valve 16 automatically to the full flow position thereof and thereafter disengage from the disc valve 16 until it is time to be reengaged therewith as the control knob 36 is moved from the keep warm position thereof to the "off" position thereof.

In order to prevent the control knob or selector 36 from being rotated too far beyond the "off" position thereof and the low flame broil setting position thereof, the ends 77 and 78 of the slot 76 can be utilized as stop means acting on the tang 119 of the drive member 116 as the respective stops for such selector means 36.

Thus, it can be seen that this invention not only provides an improved control device for a burner means, but also this invention provides an improved fuel control system utilizing such a control device or the like.

While the form of this invention now preferred has been described as required by the patent statutes, other forms may be utilized and all come within the scope of the appended claims.

What is claimed is:

1. A fuel control system comprising a source of fuel, a burner means and a control device for interconnecting said source of fuel to said burner means, said control device having a valve seat means and a valve member means for controlling said valve seat means, movable selector means carried by said control device, and clutch means carried by said control device for interconnecting said selector means to said valve member means, said clutch means having means for automatically moving said valve member means from an "off" position thereof to a full "on" position thereof as said selector means is moved in one direction from its "off" position to a first position thereof for providing full fuel flow from said source to said burner means, said means of said clutch means automatically keeping said valve member means in said full "on" position thereof as said selector means is moved in said one direction from said first position thereof to a second position thereof, said means of said clutch means automatically moving said valve member means from said full "on" position thereof to a reduced "on" position thereof as said selector means is moved in said one direction from said second position thereof to a third position thereof for providing reduced fuel flow from said source to said burner means, said means of said clutch means automatically moving said valve member means from said reduced "on" position thereof to said full "on" position thereof as said selector means is moved in a direction opposite to said one direction from said third position thereof to said second position thereof.

2. A fuel control system as set forth in claim 1 wherein said means of said clutch means automatically keeps said valve member means in said full "on" position thereof as said selector means is moved in said opposite direction from said second position thereof to said first position thereof.

3. A fuel control system as set forth in claim 2 wherein said means of said clutch means automatically moves said valve member means from said full "on" position thereof to said "off" position thereof as said selector means is moved in said opposite direction from said first position thereof to said "off" position thereof.

4. A fuel control system as set forth in claim 1 wherein said selector means is rotatably mounted to said control device whereby said one direction and said opposite direction of movement thereof are rotational directions.

5. A fuel control system comprising a source of fuel, a burner means and a control device for interconnecting said source of fuel to said burner means, said control device having a valve seat means and a valve member means for controlling said valve seat means, movable selector means carried by said control device, and clutch means carried by said control device for interconnecting said selector means to said valve member means, said clutch means having means for moving said valve member means from an "off" position thereof to a full "on" position thereof as said selector means is moved in one direction from its "off" position to a first position thereof for providing full fuel flow from said source to said burner means, said means of said clutch means keeping said valve member means in said full "on" position thereof said said selector means is moved in said one direction from said first position thereof to a second position thereof, said means of said clutch means moving said valve member means from said full "on" position thereof to a reduced "on" position thereof as said selector means is moved in said one direction from said second position thereof to a third position thereof for providing reduced fuel flow from said source to said burner means, said means of said clutch means moving said valve member means from said reduced "on" position thereof to said full "on" position thereof as said selector means is moved in a direction opposite to said one direction from said third position thereof to said second position thereof, said selector means being rotatably mounted to said control device whereby said one direction and said opposite direction of movement thereof are rotational directions, said selector means being movable in said directions without axial movement thereof.

6. A fuel control system as set forth in claim 1 wherein said selector means is adapted to be set in any selected position between said first and second positions thereof to control the temperature output effect of said burner means at a temperature selected between said first and second positions thereof.

7. A fuel control system as set forth in claim 1 wherein said selector means is adapted to be set in any selected position between said second and third positions thereof to control the flame height at said burner means.

8. A fuel control system comprising a source of fuel, a burner means and a control device for interconnected said source of fuel to said burner means, said control device having a valve seat means and a valve member means for controlling said valve seat means, movable selector means carried by said control device, and clutch means carried by said control device for interconnecting said selector means to said valve member means, said clutch means having means for moving said valve member means from an "off" position thereof to a full "on" position thereof as said selector means is moved in one direction from its "off" position to a first position thereof for providing full fuel flow from said source to said burner means, said means of said clutch means keeping said valve member means in said full "on" position thereof as said selector means is moved in said one direction from said first position thereof to a second position thereof, said means of said clutch means moving said valve member means from said full "on" position thereof to a reduced "on" position thereof as said selector means is moved in said one direction from said second position thereof to a third position thereof for providing reduced fuel flow from said source to said burner means, said means of said clutch means moving said valve member means from said reduced "on" position thereof to said full "on" position thereof as said selector means is moved in a direction opposite to said one direction from said third position thereof to said second position thereof, said valve member means having a tang means which when moved in said directions causes said valve member means to move relative to said valve seat means, said means of said clutch means comprising a cam member than engages said tang means to cause the same to move in unison therewith when said selector means moves between said "off" position thereof and said first position thereof and between said second position thereof and said third position thereof.

9. A fuel control system as set forth in claim 8 wherein said clutch means includes a cam that cams said cam member out of operative engagement with said tang means as said selector means moves between said first and second positions thereof.

10. A fuel control system as set forth in claim 9 wherein said cam is stationary and said cam member moves relative thereto in unison with movement of said selector means in said directions of movement thereof.

* * * * *